United States Patent
Hayashi et al.

(10) Patent No.: US 6,517,745 B2
(45) Date of Patent: *Feb. 11, 2003

(54) NICKEL POWDER AND CONDUCTIVE PASTE

(75) Inventors: Takao Hayashi, Yamaguchi (JP); Yasuhide Yamaguchi, Yamaguchi (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/793,133

(22) Filed: Feb. 27, 2001

(65) Prior Publication Data

US 2001/0018116 A1 Aug. 30, 2001

(30) Foreign Application Priority Data

Feb. 28, 2000 (JP) ........................................ 2000-051651

(51) Int. Cl.$^7$ ............................. H01B 1/02; H01G 4/228
(52) U.S. Cl. ..................................... 252/513; 361/306.3
(58) Field of Search ........................... 361/321.4, 306.3; 428/210; 252/512, 513

(56) References Cited

U.S. PATENT DOCUMENTS

| | | | | |
|---|---|---|---|---|
| 5,879,812 A | * | 3/1999 | Nishiyama et al. | 428/469 |
| 6,156,237 A | * | 12/2000 | Kubota et al. | 252/512 |
| 6,270,906 B1 | * | 8/2001 | Nakamura et al. | 428/469 |
| 6,295,196 B1 | * | 9/2001 | Hamaji et al. | 361/321.2 |
| 6,320,738 B1 | * | 11/2001 | Yamana et al. | 361/321.2 |
| 6,331,929 B1 | * | 12/2001 | Masuda | 361/303 |
| 6,343,002 B1 | * | 1/2002 | Shimizu et al. | 361/321.4 |

FOREIGN PATENT DOCUMENTS

JP  11-189801  7/1999

* cited by examiner

*Primary Examiner*—Cathy Lam
(74) *Attorney, Agent, or Firm*—Young & Thompson

(57) ABSTRACT

Nickel powder herein disclosed is characterized in that it has an average particle size as determined through the observation by a scanning electron microscope (SEM) ranges from 0.1 to 1 μm and that the $D_{50}$ value as determined by laser diffraction-scattering particle size distribution analysis and the average particle size as determined by SEM observation satisfy the following relation represented by Formula (1):

$1 \leq [(D_{50} \text{ value})/(\text{average particle size as determined by } SEM \text{ observation})] \leq 1.8$     (1)

The nickel powder is highly dispersible in an organic vehicle during the preparation of a conductive paste because it has low agglomerate properties and it is in an approximately monodispersed condition and the nickel powder is particularly suitable in the preparation of a conductive paste for use in making a thin internal electrode of a multilayer ceramic capacitor, which is free of any projection, because of it sharp particle distribution.

12 Claims, No Drawings

NICKEL POWDER AND CONDUCTIVE PASTE

BACKGROUND OF THE INVENTION

1. Field of the Invention

The present invention relates to nickel powder and a conductive paste and more particularly to nickel powder, which is highly dispersible in an organic vehicle during the preparation of a conductive paste because it has low agglomerate properties and it is in an approximately monodispersed condition and which is particularly suitable in the preparation of a conductive paste for use in making a thin internal electrode of a multilayer ceramic capacitor, which is free of any projection, because of it sharp particle size distribution, as well as a conductive paste comprising the nickel powder.

2. Description of the Prior Art

A multilayer ceramic capacitor comprises a plurality of ceramic dielectric layers and a plurality of internal electrode layers, which are alternately put in layers and united. In the preparation of the internal electrode of such a multilayer ceramic capacitor, metal fine powder as a material for the internal electrode is in general converted into a conductive paste, the resulting conductive paste is printed on a green sheet of a ceramic dielectric material, followed by alternately putting, in layers, the green sheets of the ceramic dielectric material and the conductive paste layers, attaching these layers to one another using pressure with heating to thus unify them, and firing the resulting laminate at a high temperature in a reducing atmosphere to thus unite the ceramic dielectric layers and the internal electrode layers.

As materials for such an internal electrode, there have conventionally been used platinum, palladium and silver-palladium, but there have recently been developed various techniques, which make use of base metals such as nickel in place of these precious metals such as platinum, palladium and silver-palladium and which have gradually been advanced.

In general, metal powder, which is prepared by a dry reaction or a wet reaction and which is not subjected to any post-treatment, is in an at least partially agglomerated state and the smaller the particle size thereof, the higher the degree of the agglomeration thereof.

Nickel powder can likewise be prepared by a dry reaction or a wet reaction, but the resulting nickel powder severely suffers from this problem of the agglomeration. In particular, the dispersibility thereof in an organic vehicle is an important factor for the preparation of a conductive paste and therefore, there has been desired for the development of nickel powder, which is less agglomerate or has a dispersed state almost identical to the monodispersed condition. If such less agglomerate nickel powder is used in the preparation of a conductive paste, the denseness of the ultimately obtained conductive layer is considerably improved, the reliability of the product obtained is also increased, in particular, the use thereof permits the inhibition of any deficiencies in electrical characteristic properties such as insulation characteristic properties and dielectric characteristic properties and this leads to an improvement of the yield of the products.

Moreover, the foregoing multilayer ceramic capacitor or the like has recently increasingly been miniaturized, the ceramic dielectric layer and the internal electrode have necessarily been thinner and the number of these layers to be laminated has correspondingly been increased. Accordingly, there have been produced laminated parts, in particular, multilayer ceramic capacitors in which the thickness of the dielectric layer is not more than 2 $\mu$m, that of the internal electrode is not more than 1.5 $\mu$m and the number of multilayer is not less than 100.

If one wishes to obtain a thin internal electrode layer, it would be sufficient to use metal fine particles having a small average particle size corresponding to the reduced thickness of the electrode layer. However, if an internal electrode layer is formed using a conductive paste comprising coarse particle-containing metal powder, such coarse particles form projections on the resulting internal electrode layer and they often break through the thin ceramic dielectric layer to thus form short circuits. To prevent the formation of any such short circuit between these internal electrode layers, it is necessary to use metal powder having an average particle size substantially smaller than the foregoing average particle size corresponding to the reduced thickness of the electrode layer.

For instance, Japanese Un-Examined Patent Publication No. Hei 11-189801 discloses nickel ultra-fine powder having an average particle size ranging from 0.2 to 0.6 $\mu$m and an existing ratio of coarse particles having a particle size of not less than 2.5 times the average particle size of not more than 0.1% as expressed in terms of the number of particles. This patent specification also discloses, in the column 4, lines 21 to 24, as follows: "For instance, if the particle size of these coarse particles is limited to not less than about 1.5 $\mu$m, the average particle size of the nickel ultra-fine powder according to the invention should be limited to 0.6 $\mu$m". In other words, the formation of a thin internal electrode layer would require the use of metal powder having a considerably small average particle size. However, the smaller the particle size, the higher the viscosity of the conductive paste containing such metal powder. Moreover, such metal powder also suffers from a problem in that heat shrinkage and/or oxidation of the metal powder are promoted upon firing.

SUMMARY OF THE INVENTION

Accordingly, it is an object of the present invention to provide nickel powder in which the agglomeration between nickel particles is inhibited, which is in an almost monodispersed condition, which is accordingly excellent in dispersibility in an organic vehicle in the preparation of a conductive paste and has a sharp particle size distribution, and which accordingly permits the preparation of a thin internal electrode layer, free of any projection, for a multilayer ceramic capacitor, without unnecessarily reducing the average particle size of the nickel powder.

It is a further object of the present invention to provide a conductive paste containing the foregoing nickel powder, which is effectively used in making, for instance, multilayer ceramic capacitor.

The inventors of this invention have conducted various studies to achieve the foregoing objects, have found that a specific deagglomeration treatment of nickel powder permits the reduction of the degree of agglomeration between nickel particles as low as possible, that if the rate of coarse particles is controlled to a relatively low level and particle sizes of most of nickel particles are adjusted so that they fall within a desired range, an internal electrode layer free of any projection can be prepared without unnecessarily reducing the particle size of nickel powder to thus reduce the probability of causing a short circuit between internal electrodes as low as possible, that the oxidation and heat shrinkage of nickel particles are inhibited because of a low rate of ultra-fine particles and that the resulting product does not correspondingly have insufficient electrical characteristic properties such as insulation characteristic properties and dielectric characteristic properties, and thus have completed the present invention based on these findings.

According to an aspect of the present invention, there is provided nickel powder whose average particle size as determined through the observation by a scanning electron microscope (SEM) ranging from 0.1 to 1 μm and wherein the $D_{50}$ value as determined by laser diffraction-scattering particle size distribution analysis and the average particle size as determined by SEM observation satisfy the following relation represented by Formula (1):

$$1 \leq [(D_{50} \text{ value})/(\text{average particle size as determined by } SEM \text{ observation})] \leq 1.8 \tag{1}$$

According to another aspect of the present invention, there is provided a conductive paste comprising the foregoing nickel powder.

DESCRIPTION OF THE PREFERRED EMBODIMENTS

As has been described above in the foregoing section entitled "Description of the Prior Art", nickel powder can be prepared by a variety of methods, but the presence of agglomeration between nickel particles would adversely affect the dispersibility thereof in an organic vehicle when preparing a conductive paste.

As an indication for evaluating this dispersibility (indirect method for evaluating dispersibility), the inventors of this invention have paid attention to the ratio:

($D_{50}$ value as determined by laser diffraction-scattering particle size distribution analysis)/(average particle size as determined by SEM observation).

More specifically, we can seize the average particle size of agglomerated particles present in the nickel powder by the $D_{50}$ value (average value of mass bass distribution) as determined by laser diffraction- scattering particle size distribution analysis and we can also seize the geometrical average particle size of individual primary particles in the powder by the average particle size as determined by SEM observation. As the ratio is closer to 1, the nickel powder is closer to the monodispersed condition or excellent in the dispersibility.

In other words, the nickel powder according to the present invention has an average particle size as determined by SEM observation ranging from 0.1 to 1 μm, preferably 0.5 to 1 μm and a ratio: ($D_{50}$ value as determined by laser diffraction-scattering particle size distribution analysis)/(average particle size as determined by SEM observation) of not less than 1 and not more than 1.8, preferably not more than 1.5 and more preferably not more than 1.3.

Theoretically, the foregoing formula cannot have a value of less than 1. Moreover, if the foregoing formula has a value of more than 1.8, 1.8 primary particles agglomerate on the average and such nickel powder is inferior in the dispersibility in an organic vehicle in the preparation of a conductive paste.

In addition, the nickel powder according to the present invention preferably comprises particles having a particle size of not less than 1.5 times the $D_{50}$ value in a rate of not more than 20% of the total number of particles, as determined by the laser diffraction-scattering particle size distribution analysis. If the rate of such particles falls within the range specified above, any substantial number of coarse particles are not present in the nickel powder and therefore, the resulting multilayer capacitor is less susceptible to the short circuit between the electrodes. More preferably, the rate of the particles having a particle size of not less than 1.5 times the $D_{50}$ value is not more than 15% and particularly preferably not more than 10% of the total number of particles.

In addition, the nickel powder according to the present invention preferably comprises particles having a particle size of not more than 0.5 time the $D_{50}$ value in a rate of not more than 5% of the total number of particles, as determined by the laser diffraction-scattering particle size distribution analysis. If the rate of such particles falls within the range specified above, any substantial number of fine particles are not present in the nickel powder and therefore, the nickel powder is less susceptible to agglomeration and excellent in the dispersibility in an organic vehicle upon the incorporation thereof in a conductive paste. More preferably, the rate of the particles having a particle size of not more than 0.5 times the $D_{50}$ value is not more than 3% and particularly preferably not more than 1% of the total number of particles.

Moreover, in the particle size determination by the SEM observation with a magnification of about ×10000, the nickel powder of the present invention preferably comprises particles having a particle size of not less than 1.2 times the average particle size on the order of not more than 10%, more preferably not more than 7% and particularly preferably not more than 5% of the total number of particles. In addition, the nickel powder preferably comprises particles having a particle size of not more than 0.8 time the average particle size on the order of not more than 10%, more preferably not more than 7% and particularly preferably not more than 5% of the total number of particles.

The nickel powder having the foregoing characteristic properties has a sharp particle size distribution. Therefore, if the powder is used in making an internal electrode for a multilayer ceramic capacitor, the thickness of the resulting capacitor can be reduced and the capacity thereof can likewise be increased without unnecessarily reducing the particle size of the nickel fine powder and further the use of the nickel powder would permit the inhibition of the occurrence of any short circuit between the internal electrode layers, in particular, the formation of capacitors having insufficient electrical characteristic properties such as insulating failure and insufficient dielectric characteristics.

Furthermore, the nickel powder according to the present invention preferably has a coefficient of variation (CV) as determined by the following Formula (2) of less than 40%, more preferably less than 35% and particularly preferably less than 30%.

$$CV(\%) = (\sigma/x) \times 100 \tag{2}$$

(In the formula (2), x represents the $D_{50}$ value as determined by laser diffraction-scattering particle size distribution analysis and σ represents the standard deviation for the particle number distribution in the laser diffraction-scattering particle size distribution analysis).

When forming an internal electrode for a multilayer ceramic capacitor using a conductive paste containing the nickel powder having such characteristic properties, the thickness of the resulting capacitor can be reduced and the number of layers to be laminated can be increased, to extents identical to or higher than those achieved by the use of the conductive paste containing the nickel powder having the foregoing particle size distribution.

In addition, the nickel powder of the present invention may be pure nickel powder, nickel powder containing a metal oxide within each fine particle constituting the nickel powder or nickel powder in which the surface of each fine particle is covered with a metal oxide. However, the nickel powder is preferably nickel powder in which the surface of each fine particle is uniformly covered with a metal oxide, while taking into consideration the improvement of the resistance to oxidation of nickel upon the removal of the binder and of resistance to diffusion thereof into the ceramic dielectric material as well as the improvement of the heat shrinkage. The amount of the metal oxide to be coated preferably ranges from 0.05 to 10% by mass on the basis of the mass of the metal nickel fine particles.

The metal oxides to be coated may be, for instance, oxides or double oxides of at least one metal element belonging to the Groups 2 to 14 of the Periodic Table having an atomic number ranging from 12 to 82 and preferably at least one metal element belonging to the Groups 2, 3, 4, 7, 13 and 14 of the Periodic Table having an atomic number ranging from 12 to 82. Specific examples thereof are at least one member selected from the group consisting of MgO, CaO, SrO, BaO, ZnO, $Al_2O_3$, $Ga_2O_3$, $Y_2O_3$, $SiO_2$, $TiO_2$, $ZrO_2$, $Cr_2O_3$, $MnO_2$, $Mn_3O_4$, PbO, $Nb_2O_5$, $Nd_2O_3$, $Sm_2O_3$, $Dy_2O_3$, $Er_2O_3$, $Ho_2O_3$, $BaTiO_3$, $CaTiO_3$, $SrTiO_3$, $MgTiO_3$, $BaZrO_3$, $CaZrO_3$, $SrZrO_3$, $(Mg, Ca)TiO_3$, $(Ba, Ca)(Ti, Zr)O_3$, $PbTiO_3$, $Pb(Zr, Ti)O_3$, $(Pb, Ca)TiO_3$, $MgAl_2O_4$ and $BaTi_4O_9$. These oxides and double oxides may be doped with a metal such as Nb, W, La, Y and/or Mo.

Then preferred methods for preparing the nickel powder according to the present invention will be detailed below.

The nickel powder may in general be prepared by a dry or wet method such as a liquid phase reduction-separation method, a gas phase chemical reaction method, an evaporation in gas phase method, but characteristic properties of the powder such as shapes, particle size distribution and agglomeration may vary depending on each particular method selected.

Nickel powder as a starting material used in the preparation of the nickel powder of the present invention may be one obtained by a dry or wet method.

It would be quite difficult to obtain nickel powder in which the agglomeration between nickel particles is inhibited, which is excellent in the dispersibility in an organic vehicle upon the preparation of a conductive paste and whose particle size distribution is quite sharp, simply by the foregoing preparation method. Therefore, to obtain such nickel powder, it is quite desirable to use nickel powder from which strongly agglomerated particles and extremely large particles are removed in advance and to subject the nickel powder to a treatment for making the particle surface smooth so that agglomerated particles are completely separated and the separated particles are less susceptible to secondary agglomeration.

In the foregoing treatment of the nickel powder, the pre-treatment for the removal of strongly agglomerated particles and quite large particles is quite important from the viewpoint of not only making the particle size uniform, but also certainly and stably ensuring the desired effect of the subsequent deagglomeration treatment. Regarding the pre-treatment, the use of, for instance, a sieve or sifter is improper while taking into consideration the inhibition of the oxidation of the nickel particle surface and workability. The most preferred means therefore are, for instance, a wind power classifying device and more specifically centrifugal classifying device such as an air separator, Spedic Classifier, Aquecut, a turbo-classifier.

Moreover, in the deagglomeration treatment subsequently carried out, it is important to use, in combination, a high shear device for certainly separating agglomerated nickel particles and a device ensuring strong milling and frictional functions (including frictional action between nickel particles). The treatment with these devices excellent in these functions permits the formation of the nickel powder having almost monodispersed condition and a low degree of agglomeration and also permits the control of the secondary agglomeration.

Typical examples of the foregoing high shear device and the device ensuring high milling and frictional functions include roller mills, but the principal function of such a device is too strong to control the other functions thereof or such a device shows other strong functions, in particular, a strong compression function and therefore, the device is often unsuitably applied to metal powder showing a high extensibility.

As a result of taking into consideration these drawbacks, the inventors of this invention have found that the nickel powder of the present invention can conveniently be prepared in two or more steps through the simultaneous use of a pulverization device having a high shear function and a pulverization device showing high milling and friction functions, upon the deagglomeration.

More specifically, the inventors have thus concluded as follows: it is preferred that a high shear device be first used for separating nickel particles agglomerated and thereafter a pulverization device showing high milling and frictional functions be used for improving the smoothness of the surface of these particles thus deagglomerated.

Examples of the foregoing high shear devices preferably used herein are a pulverizer (available from HOSOKAWA MICRON CORPORATION), Super Micron (available from HOSOKAWA MICRON CORPORATION) and Supermass-colloider (available from Masuko Sangyo Co., Ltd.), while examples of preferred pulverization devices showing high milling and frictional functions are Dyno Mill (available from Willy A. Bachofen AG Maschinenfabrik), Hallel Homogenizer (available from Kokusan Seiko Co., Ltd.) and Jet-Mill (available from Ebara Corporation).

These devices are not restricted to any particular one insofar as they basically have the foregoing functions (shear, milling and/or frictional functions), although there have been known a variety of devices showing such functions, known under various generic names, general names and trade names and some of them have the same functions although they have different designations.

In addition, the deagglomeration treatment may be a dry or wet method and in this respect, it is also possible to devise any measure for controlling the oxidation of nickel particles.

More specifically, if the deagglomeration treatment is carried out by the dry method, the nickel powder is preferably subjected to this treatment in an inert gas or reducing gas atmosphere. Specific examples of such inert gases and reducing gases are nitrogen, argon, helium, carbon monoxide and hydrogen-containing nitrogen gases, which are passed through the deagglomeration device. Preferably, the oxygen concentration within the device in which the deagglomeration treatment is performed is adjusted to not more than 10000 ppm and the temperature in the device is controlled to the range of from 15 to 30° C.

On the other hand, if the deagglomeration treatment is carried out by the wet method, a reducing agent is preferably added to a nickel powder-containing slurry. Specific examples of such reducing agents are ethylenediamine tetraacetic acid, formaldehyde, sodium tetrahydroborate, hypophosphorous acid, and hydrazine type reducing agents. Preferably, the reducing agent is added to the nickel powder slurry in an amount ranging from 0.0005 to 1 eq. and the temperature of the nickel powder-containing slurry is controlled to the range of from 25 to 80° C. during the deagglomeration treatment.

We will now describe preferred methods for the preparation of the conductive paste according to the present invention.

The conductive paste of the present invention comprises, for instance, the foregoing nickel powder of the present invention, a resin and a solvent, as well as a dispersant and/or a sintering-inhibitory agent or the like, as optional components. More specifically, examples of resins are cellulose derivatives such as ethyl cellulose; vinyl group-containing uncured resins such as acrylic resins, polyvinyl butyral resins and polyvinyl alcohols; and thermosetting resins such as epoxy resins and acrylics, which are preferably used in combination with peroxides. In addition, examples of the foregoing solvents are terpineol, tetralin, butyl carbitol and carbitol acetate, which can be used alone or in any combination. Moreover, the conductive paste may if necessary comprise glass frits. The conductive paste according to the present invention can be prepared by mixing, with stirring, the foregoing ingredients in a mixing device such as a ball mill or a three roll mill.

The present invention will hereunder be described in more detail with reference to the following Examples and Comparative Examples, but the present invention is not restricted to these specific Examples at all.

EXAMPLE 1

Nickel sulfate hexahydrate (nickel content: 22.2% by mass; 44.8 Kg) was dissolved in 80 L of pure water to give an aqueous solution, followed by gradual and dropwise addition of the resulting aqueous solution to 100 L of a 200 g/L aqueous solution of sodium hydroxide while maintaining the temperature of the mixture to 60° C. to thus separate out nickel hydroxide.

Hydrazine monohydrate (30 Kg) was added to the resulting suspension over 30 minutes while maintaining the temperature of the suspension to 60° C. to thus reduce the nickel hydroxide into elemental nickel. After the filtration of the resulting nickel particle-containing slurry, the nickel particles were washed with pure water till the pH value of the wash liquid reached not more than 9 and then dried to give nickel powder.

This nickel powder was treated using an air separator: SF Sharp Cut Separator KSC-02 Model (available from Kurimoto, Ltd.) at a number of rotor revolutions of 6000 rpm and an air flow rate of 7.2 m$^3$/min to thus remove coarse particles.

The resulting nickel powder from which coarse particles were removed was fed to Pulverizer AP-1LSH Model (available from HOSOKAWA MICRON CORPORATION) equipped with a knife-like hammer and treated therein at 2500 rpm, followed by addition of 80 L of pure water to the resulting nickel powder, treatment of the slurry in Hallel Homogenizer KH-2 Model (available from Kokusan Seiko Co., Ltd.) at 5000 rpm and a slurry-treating speed of 27.5 L/min over 2 hours, subsequent filtration and drying to give nickel powder.

This nickel powder (0.1 g) was admixed with a 0.1% aqueous solution of SN Dispersant 5468 (available from San Nopco Limited), followed by dispersion thereof in the solution in an ultrasonic homogenizer (US-300T, available from Nihonseiki Kaisha Ltd.) for 5 minutes, and determination of the $D_{50}$ value using a laser diffraction-scattering particle size distribution measuring device: Micro Trac HRA 9320-X100 Model (available from Leeds+Northrup Company). As a result, the value was found to be 0.50 μm, the rate of particles having a particle size greater than 0.75 μm (0.50×1.5 0.750) was found to be 4.2% of the total number of particles and the rate of particles having a particle size smaller than 0.25 μm (0.50×0.5=0.250) was found to be 1.0% of the total number of particles.

Separately, the nickel powder was observed by an SEM with a magnification of ×10000 to thus determine the particle sizes of 1500 particles in all present in 5 visual fields selected at random. As a result, the average particle size was found to be 0.43 μm, the number of particles having a particle size greater than 0.51 μm (0.4×1.2=0.516) was found to be 29 particles, which corresponded to 1.9% of the total number of particles and the number of particles having a particle size smaller than 0.35 μm (0.43×0.8=0.344) was found to be 68 particles, which corresponded to 4.5% of the total number of particles.

As will be clear from the foregoing measured results, the rate: ($D_{50}$ value as determined by laser diffraction-scattering particle size distribution analysis)/(average particle size as determined by SEM observation) was found to be 0.50/0.43=1.16.

To 50 parts by mass of this nickel powder, there was added a vehicle comprising 5 parts by mass of ethyl cellulose, 60 parts by mass of mineral sprit and 35 parts by mass of butyl carbitol, followed by mixing these ingredients, and kneading the resulting mixture in a three roll mill to give a conductive paste. This conductive paste was used for forming an assembly having a thickness of the dielectric layer of 2 μm, a thickness of the internal electrode layer of 1.5 μm, a number of multilayer of 350 and the resulting assembly was fired to give a capacitor having a size of 2.0×1.25×1.25 mm. Ceramic capacitors (200 pieces) were taken out of these ceramic capacitors prepared at random to determine the number of products, which were insufficient in electrical characteristic properties such as insulation properties and dielectric characteristics. As a result, the number of rejects was found to be 1 and the percent defective was found to be 0.5%.

EXAMPLE 2

Anhydrous nickel chloride (22.0 Kg), which had been sufficiently dried and had a sulfur content of 500 ppm, was allowed to stand in a quartz container and then evaporated, with heating, in an argon gas stream, as a carrier gas, of 10 L/min, while maintaining the temperature in the container to 900° C. Hydrogen gas for reduction was passed through the evaporated nickel chloride gas at a flow rate of 3.5 L/min, while the reducing temperature was controlled to 1000° C. to give nickel powder. The resulting nickel powder was washed with pure water till the pH value of the wash liquid reached not more than 9, followed by filtration, subsequent drying and removal of coarse particles in the same manner used in Example 1.

The nickel powder from which coarse particles were removed was treated using Super Micron M52NC Model (available from HOSOKAWA MICRON CORPORATION) at a number of rotor revolutions of 1500 rpm, followed by the addition of 80 L of pure water to the resulting nickel powder, the treatment of the resulting suspension using Dyno Mill KDL Model (available from Willy A. Bachofen AG Maschinenfabrik) (glass beads: particle size 2 mmφ) at a rate of 1 L/min for 15 minutes, filtration and drying to give nickel powder.

This nickel powder (0.1 g) was admixed with a 0.1% aqueous solution of SN Dispersant 5468 (available from San Nopco Limited), followed by dispersion thereof in the solution in an ultrasonic homogenizer (US-300T, available from Nihonseiki Kaisha Ltd.) for 5 minutes, and determination of the $D_{50}$ value using a laser diffraction-scattering particle size distribution measuring device: Micro Trac HRA 9320-X100 Model (available from Leeds+Northrup Company). As a result, the value was found to be 0.55 µm, the rate of particles having a particle size greater than 0.82 µm (0.55×1.5=0.825) was found to be 6.3% of the total number of particles and the rate of particles having a particle size smaller than 0.28 µm (0.55×0.5=0.275) was found to be 1.6% of the total number of particles.

Separately, the nickel powder was observed by an SEM with a magnification of ×10000 to thus determine the particle sizes of 1500 particles in all present in 5 visual fields selected at random. As a result, the average particle size was found to be 0.40µm, the number of particles having a particle size greater than 0.48 µm (0.40×1.2=0.480) was found to be 77 particles, which corresponded to 5.1% of the total number of particles and the number of particles having a particle size smaller than 0.32 µm (0.40×0.8=0.320) was found to be 92 particles, which corresponded to 6.1% of the total number of particles.

As will be clear from the foregoing measured results, the rate: ($D_{50}$ value as determined by laser diffraction-scattering particle size distribution analysis)/(average particle size as determined by SEM observation) was found to be 0.55/0.40=1.38.

To 50 parts by mass of this nickel powder, there was added a vehicle comprising 5 parts by mass of ethyl cellulose, 60 parts by mass of mineral sprit and 35 parts by mass of butyl carbitol, followed by mixing these ingredients, and kneading the resulting mixture in a three roll mill to give a conductive paste. This conductive paste was used for forming an assembly having a thickness of the dielectric layer of 2 µm, a thickness of the internal electrode layer of 1.5 µm, a number of multilayer of 350 and the resulting assembly was fired to give a capacitor having a size of 2.0×1.25×1.25 mm. Ceramic capacitors (200 pieces) were taken out of these ceramic capacitors prepared at random to determine the number of products, which were insufficient in electrical characteristic properties such as insulation properties and dielectric characteristics. As a result, the number of rejects was found to be 2 and the percent defective was found to be 1%.

Comparative Example 1

The same procedures used in Example 1 were repeated except that any deagglomeration treatment was not used to give nickel powder.

This nickel powder (0.1 g) was admixed with a 0.1% aqueous solution of SN Dispersant 5468 (available from San Nopco Limited), followed by dispersion thereof in the solution in an ultrasonic homogenizer (US-300T, available from Nihonseiki Kaisha Ltd.) for 5 minutes, and determination of the $D_{50}$ value using a laser diffraction-scattering particle size distribution measuring device: Micro Trac HRA 9320-X100 Model (available from Leeds+Northrup Company). As a result, the value was found to be 0.87 µm, the rate of particles having a particle size greater than 1.30 µm (0.87×1.5=1.305) was found to be 15.0% of the total number of particles and the rate of particles having a particle size smaller than 0.44 µm (0.87×0.5=0.435) was found to be 5.2% of the total number of particles.

Separately, the nickel powder was observed by an SEM with a magnification of ×10000 to thus determine the particle sizes of 1500 particles in all present in 5 visual fields selected at random. As a result, the average particle size was found to be 0.44 µm, the number of particles having a particle size greater than 0.52 µm (0.44×1.2=0.528) was found to be 93 particles, which corresponded to 6.2% of the total number of particles and the number of particles having a particle size smaller than 0.36 µm (0.44×0.8=0.352) was found to be 83 particles, which corresponded to 5.5% of the total number of particles.

As will be clear from the foregoing measured results, the rate: ($D_{50}$ value as determined by laser diffraction-scattering particle size distribution analysis)/(average particle size as determined by SEM observation) was found to be 0.87/0.44=1.98.

To 50 parts by mass of this nickel powder, there was added a vehicle comprising 5 parts by mass of ethyl cellulose, 60 parts by mass of mineral sprit and 35 parts by mass of butyl carbitol, followed by mixing these ingredients, and kneading the resulting mixture in a three roll mill to give a conductive paste. This conductive paste was used for forming an assembly having a thickness of the dielectric layer of 2 µm, a thickness of the internal electrode layer of 1.5 µm, a number of multilayer of 350 and the resulting assembly was fired to give a capacitor having a size of 2.0×1.25×1.25 mm. Ceramic capacitors (200 pieces) were taken out of these ceramic capacitors prepared at random to determine the number of products, which were insufficient in electrical characteristic properties such as insulation properties and dielectric characteristics. As a result, the number of rejects was found to be 12 and the percent defective was found to be 6%.

Comparative Example 2

The same procedures used in Example 1 were repeated except that the treatment with Hallel Homogenizer was omitted to give nickel powder.

This nickel powder (0.1 g) was admixed with a 0.1% aqueous solution of SN Dispersant 5468 (available from San Nopco Limited), followed by dispersion thereof in the solution in an ultrasonic homogenizer (US-300T, available from Nihonseiki Kaisha Ltd.) for 5 minutes, and determination of the $D_{50}$ value using a laser diffraction-scattering particle size distribution measuring device: Micro Trac HRA 9320-X100 Model (available from Leeds+Northrup Company). As a result, the value was found to be 0.80 µm, the rate of particles having a particle size greater than 1.20 µm (0.80×1.5=1.200) was found to be 7.3% of the total number of particles and the rate of particles having a particle size smaller than 0.40 µm (0.80×0.5=0.400) was found to be 2.6% of the total number of particles.

Separately, the nickel powder was observed by an SEM with a magnification of ×10000 to thus determine the particle sizes of 1500 particles in all present in 5 visual fields selected at random. As a result, the average particle size was found to be 0.42 µm, the number of particles having a particle size greater than 0.50 µm (0.42×1.2=0.504) was found to be 80 particles, which corresponded to 5.3% of the total number of particles and the number of particles having a particle size smaller than 0.34 µm (0.42×0.8=0.336) was found to be 98 particles, which corresponded to 6.5% of the total number of particles.

As will be clear from the foregoing measured results, the rate: ($D_{50}$ value as determined by laser diffraction-scattering particle size distribution analysis)/(average particle size as determined by SEM observation) was found to be 0.80/0.42 1.90.

To 50 parts by mass of this nickel powder, there was added a vehicle comprising 5 parts by mass of ethyl cellulose, 60 parts by mass of mineral sprit and 35 parts by mass of butyl carbitol, followed by mixing these ingredients, and kneading the resulting mixture in a three roll mill to give a conductive paste. This conductive paste was used for forming an assembly having a thickness of the dielectric layer of 2 μm, a thickness of the internal electrode layer of 1.5 μm, a number of multilayer of 350 and the resulting assembly was fired to give a capacitor having a size of 2.0×1.25×1.25 mm. Ceramic capacitors (200 pieces) were taken out of these ceramic capacitors thus prepared, at random, to determine the number of products, which were insufficient in electrical characteristic properties such as insulation properties and dielectric characteristics. As a result, the number of rejects was found to be 5 and the percent defective was found to be 2.5%.

As has been described above in detail, the nickel powder according to the present invention is highly dispersible in an organic vehicle during the preparation of a conductive paste because of the low agglomerate properties and the approximately monodispersed condition and the nickel powder is particularly suitable in the preparation of a conductive paste for use in making a thin internal electrode of a multilayer ceramic capacitor, which is free of any projection, because of it sharp particle distribution.

What is claimed is:

1. Nickel powder characterized in that it has an average particle size as determined through the observation by a scanning electron microscope (SEM) ranging from 0.1 to 1 μm and that the $D_{50}$ value as determined by laser diffraction-scattering particle size distribution analysis and the average particle size as determined by SEM observation satisfy the following relation represented by Formula (1):

$$1 \leq [(D_{50} \text{ value})/(\text{average particle size as determined by } SEM \text{ observation})] \leq 1.8 \qquad (1).$$

2. The nickel powder as set forth in claim 1, wherein in the laser diffraction-scattering particle size distribution analysis, the rate of particles having a particle size of not less than 1.5 times the $D_{50}$ value is not more than 20% of the total number of particles and the rate of particles having a particle size of not more than 0.5 time the $D_{50}$ value is not more than 5% of the total number of particles.

3. The nickel powder as set forth in claim 1, wherein in the particle size determination by the SEM observation, the rate of particles having a particle size of not less than 1.2 times the average particle size is not more than 10% of the total number of particles and the rate of particles having a particle size of not more than 0.8 time the average particle size is not more than 10% of the total number of particles.

4. The nickel powder as set forth in claim 2, wherein in the particle size determination by the SEM observation, the rate of particles having a particle size of not less than 1.2 times the average particle size is not more than 10% of the total number of particles and the rate of particles having a particle size of not more than 0.8 time the average particle size is not more than 10% of the total number of particles.

5. A conductive paste comprising nickel powder as set forth in claim 1.

6. A conductive paste comprising nickel powder as set forth in claim 2.

7. A conductive paste comprising nickel powder as set forth in claim 3.

8. A conductive paste comprising nickel powder as set forth in claim 4.

9. The conductive paste as set forth in claim 5, wherein it is used in making a multilayer ceramic capacitor.

10. The conductive paste as set forth in claim 6, wherein it is used in making a multilayer ceramic capacitor.

11. The conductive paste as set forth in claim 7, wherein it is used in making a multilayer ceramic capacitor.

12. The conductive paste as set forth in claim 8, wherein it is used in making a multilayer ceramic capacitor.

* * * * *